Patented May 26, 1953

2,640,086

UNITED STATES PATENT OFFICE 2,640,086

PROCESS FOR SEPARATING HYDROGEN FLUORIDE FROM CHLORODIFLUORO-METHANE

Robert H. Baldwin, Chadds Ford, Pa., assignor to E. I. du Pont de Nemours and Company, Wilmington, Del., a corporation of Delaware No Drawing. Application December 15, 1951, Serial No. 261,929

9 Claims. (Cl. 260—653)

This invention relates to a process for separating hydrogen fluoride from monochlorodifluoromethane, and more particularly, separating these components from the reaction mixture obtained in the fluorination of chloroform with hydrogen fluoride.

In the fluorination of chloroform in the presence of a catalyst, a reaction mixture is produced which consists essentially of HCl, HF, $CHClF_2$, $CHCl_2F$, $CHCl_3$, and $CHF_3$. A method of separating these components is disclosed in U. S. Patent No. 2,450,414 which involves separating the components by a special fractional distillation under appropriate temperatures and pressures. In this method, the components separate satisfactorily except monochlorodifluoromethane and hydrogen fluoride which, unfortunately, form an azeotrope containing from about 1% to 2.2% by weight of HF. The two components of this azeotrope are separated by scrubbing in water wherein hydrofluoric acid is formed and removed from the monochlorodifluoromethane. In this method of separation, a serious loss of HF in the wash water is involved and represents an important economic factor in the cost of the fluorination process.

Several suggestions have been made for recovering the HF from the above-mentioned system. According to U. S. Patent No. 2,374,819, the HF is absorbed on activated charcoal from which it is subsequently recovered. This method, however, is cumbersome and involves the installation of specialized equipment which adds considerably to the cost of the recovery of the HF. Moreover, it is a batch process which is inconvenient in that it requires a bank of absorbing beds of activated charcoal if the recovery of HF is to be continuous.

Another method of recovering the HF consists of forming an adduct between it and sodium fluoride or potassium fluoride. This process likewise is costly and requires considerable supervision.

It is an object of this invention, therefore, to provide a process for separating HF and $CHClF_2$ economically. Another object is the provision of a method of separating these two components without the use of special or expensive equipment. A still further object is the provision of a method by which the hydrogen fluoride recovered is in a form usable for further reaction with chloroform. A still further object is the provision of a method which may be conducted continually with a minimum of attention. Other objects will appear as the description of the invention proceeds.

These objects are accomplished essentially by subjecting a mixture of hydrogen fluoride and monochlorodifluoromethane in the liquid phase to temperatures below 0° C., preferably at about —30° C. to —50° C., at either atmospheric or super-atmospheric pressures, together with from about 0.25 mol to about 2.5 mols of chloroform per mol of chlorodifluoromethane contained in the mixture and separating an upper layer rich in HF from a lower organic layer. The process is operative with mixtures containing up to 77% by weight of HF.

It has been found that chloroform is substantially immiscible with HF at temperatures below 0° C., and that at —50° C., HF is soluble in chloroform to the extent of only 0.063% by weight. Chlorodifluoromethane and hydrogen fluoride are completely miscible at temperatures at least down to —50° C., and at this temperature a 50% by weight solution of HF in the chlorodifluoromethane is homogeneous. In the preferred method, temperatures of about —30° C. to —50° C. are preferred for the separation. However, considerable extension of either side of this range is permissible.

In carrying out the invention, chloroform is added to the mixture of hydrogen fluoride and chlorodifluoromethane preferably in the ratio of about from 0.25 to about 2.5 mols of chloroform per mol of monochlorodifluoromethane. However, a somewhat smaller amount of chloroform may be used, since the limiting value is the approach to the formation of the HF-$CHClF_2$ azeotrope. On the other hand, amounts of chloroform greater than the upper limit of the range may be used, but HF has a solubility in chloroform of 0.063% by weight at —50° C., and as the amount of chloroform is increased, more HF would be dissolved in the organic layer of chloroform and chlorodifluoromethane. The preferred ratio of chloroform is between 1 and 2 mols per mol of $CHClF_2$.

With respect to the concentration of hydrogen fluoride, this may vary from as low as 0.5% up to about 77% by weight in the HF-$CHClF_2$ mixture. The normal amount of hydrogen fluoride in the HF-organic liquid after removal of HCl from the products of the fluorination mentioned above is usually about 3% by weight.

EXAMPLES I TO VI

A pressure cylinder was filled with HF, $CHClF_2$, and $CHCl_3$ in the amounts required to make up a total charge. The cylinder was held at —50° C. for one hour with frequent shaking. After a settling time of about two minutes, a sample of the upper layer which contained the HF and the lower organic layer which was made up of $CHClF_2$ and $CHCl_3$ was taken, care being taken to prevent mixing between the layers. Each layer was vaporized and the gases scrubbed with water, and the organic layer was recondensed. The scrubber water was titrated for acidity and the hydrofluoric acid content was computed. The organic fractions were collected over carbon dioxide ice, weighed, and their compositions estimated from initial boiling point and boiling range measurements. The results from the above experiments are tabulated below, each of which was carried out in identical manner except as indicated in the table.

*Table I*

$CHClF_2$-HF-$CHCl_3$ PHASE EQUILIBRIA

| Example | Composition, Wt. Percent | | | Mol Ratio | Temp., °C. |
|---|---|---|---|---|---|
| | $CHClF_2$ | HF | $CHCl_3$ | $\frac{CHCl_3}{CHClF_2}$ | |
| 1. Total charge | 29.4 | 38.8 | 31.8 | .78 | −50 |
| Organic layer | 44.9 | 0.28 | 55.8 | 0.9 | |
| HF layer | 13 | 81 | 6 | | |
| 2. Total charge | 58.6 | 21.2 | 20.2 | 0.25 | −50 |
| Organic layer | 72.5 | 0.96 | 26.6 | 0.264 | |
| HF layer | 32.4 | 59.5 | 8.2 | | |
| 3. Total charge | 13.1 | 44.2 | 42.7 | 2.4 | −50 |
| Organic layer | 21.8 | 0.15 | 78.0 | 2.5 | |
| HF layer | 4.1 | 92.5 | 3.4 | | |
| 4. Total charge | | 47.1 | 52.9 | | −50 |
| Organic layer | | 0.063 | 99.9 | | |
| HF layer | | 95.4 | 4.6 | | |
| 5. Total charge | 29.6 | 38.4 | 31.9 | 0.78 | −40 |
| Organic layer | | 0.32 | | | |
| HF layer | | 83 | | | |
| 6. Total charge | 50 | 50 | | | −50 |
| Organic layer | | | | | |
| HF layer | 50 | 50 | | | |

EXAMPLE VII

This example illustrates a continuous operation of the invention. Chloroform flowing at the rate of 936 parts per hour, was reacted with 337 parts per hour of hydrogen fluoride in the presence of an antimony chloride catalyst. The HCl formed was removed from the remaining reaction products by distillation. The effluent liquid mixture from the fluorination chamber minus the HCl was drawn off at a temperature of 18° C. under a gage pressure of 110 p. s. i. at the rate of 645 parts per hour of $CHClF_2$, 24 parts per hour of HF, 2.1 parts per hour of $COCl_2$, and small amounts of $SO_2$, $CHCl_2F$, $CHF_3$, and a trace of HCl. Into this stream, 893 parts per hour of chloroform was injected and the resulting mixture was cooled to −50° C. by passing it through a heat exchanger. The cooled liquid was allowed to separate in two layers in a separation tank at a gage pressure of about 90 p. s. i. The top layer was withdrawn continuously and analyzed 1.4 parts per hour of chloroform, 3.0 parts per hour of $CHClF_2$, 20 parts per hour of HF and a trace of $SO_2$, $COCl_2$, and HCl. This stream was then recycled for further reaction with chloroform in the catalytic chamber.

The bottom layer was also continuously withdrawn and analyzed 642 parts per hour of $CHClF_2$, 891 parts per hour of $CHCl_3$, 3.6 parts per hour of HF and small amounts of $COCl_2$, $SO_2$ and HCl. This mixture was distilled to separate the chloroform from the other compounds present. The overhead fraction was principally $CHClF_2$ with the minor portions of acidic constituents. This overhead fraction was then scrubbed to remove the acidic constituents.

An alternative method of treating the lower liquid is to remove the HF, HCl, $SO_2$, and $COCl_2$ and then separate the $CHClF_2$ and $CHCl_3$ by distillation. The chloroform so obtained is then either returned to the HF-$CHClF_2$ separation system or to the reaction chamber where it is reacted with HF catalytically.

The present invention offers many advantages, the chief of which is that no extraneous reagents are added to effect the separation. The chloroform used is one of the reactants of the main reaction which produces the mixture with which the present invention is concerned. Another advantage of the present invention is that the hydrogen fluoride recovered is in an anhydrous form suitable for use in the fluorination process.

It is apparent that many widely different embodiments of this invention may be made without departing from the spirit and scope thereof, and therefore it is not intended to be limited except as indicated in the appended claims.

I claim:
1. The process of separating a mixture of hydrogen fluoride and monochlorodifluoromethane which comprises adding chloroform to the mixture and subjecting the same to a temperature below 0° C., allowing two layers to form and thereafter separating the said layers, the ratio of the chloroform to the monochlorodifluoromethane being from 0.25 mol to 2.5 mols of chloroform per mol of monochlorodifluoromethane.

2. The process of claim 1 in which the temperature is from about −30° C. to about −50° C.

3. The process of claim 1 in which the chloroform is added in the amount of from 1 mol to about 2 mols of chloroform per mol of monochlorodifluoromethane.

4. The process of claim 1 in which the hydrogen fluoride is present up to 77% by weight of the HF-$CHClF_2$ mixture.

5. In the process of reacting hydrogen fluoride and chloroform in the presence of a catalyst and separating the resulting products, one of which is a mixture of hydrogen fluoride and monochlorodifluoromethane, the improvement which comprises adding chloroform thereto, subjecting the same to a temperature below 0° C., allowing the cooled mixture to form two immiscible layers and thereafter separating the same, the ratio of the chloroform to the monochlorodifluoromethane being from 0.25 mol to 2.5 mols of chloroform per mol of monochlorodifluoromethane.

6. The process of claim 5 in which the temperature is from about −30° C. to about −50° C.

7. The process of claim 5 in which the chloroform is added in the amount of from 1 mol to about 2 mols of chloroform per mol of monochlorodifluoromethane.

8. The process of claim 5 in which the hydrogen fluoride is present in amount less than 77% by weight of the $HF$-$CHClF_2$ mixture.

9. In a continuous process of fluorinating chloloform by passing a mixture of hydrogen fluoride and chloroform over a catalyst wherein a product containing unreacted hydrogen fluoride and monochlorodifluoromethane is obtained, the improvement which comprises separating the hydrogen fluoride from the monochlorodifluoromethane by adding from about 0.25 mol to about 2.5 mols of chloroform thereto for each mol of monochlorodifluoromethane, subjecting the mixture to a temperature below 0° C., separating the two layers so formed, returning the upper HF layer to the reaction mixture and recovering chloroform from the lower layer and returning it to the said mixture.

ROBERT H. BALDWIN.

References Cited in the file of this patent

UNITED STATES PATENTS

| Number | Name | Date |
|---|---|---|
| 2,005,710 | Daudt | June 18, 1935 |